US006168133B1

(12) United States Patent
Heinz et al.

(10) Patent No.: US 6,168,133 B1
(45) Date of Patent: Jan. 2, 2001

(54) PIEZOELECTRICALLY ACTUATED FUEL INJECTION VALVE

(75) Inventors: Rudolf Heinz, Renningen; Dieter Kienzler, Leonberg; Roger Potschin, Brackenheim; Klaus-Peter Schmoll, Lehrensteinsfeld; Friedrich Boecking, Stuttgart, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/319,168

(22) PCT Filed: Jun. 27, 1998

(86) PCT No.: PCT/DE98/01763

§ 371 Date: Jun. 2, 1999

§ 102(e) Date: Jun. 2, 1999

(87) PCT Pub. No.: WO99/18347

PCT Pub. Date: Apr. 15, 1999

(30) Foreign Application Priority Data

Oct. 2, 1997 (DE) ............................................. 197 43 668

(51) Int. Cl.[7] .................................................. F16K 31/124

(52) U.S. Cl. .................. 251/57; 251/30.02; 251/129.06; 251/129.07

(58) Field of Search ......................... 251/129.06, 129.07, 251/57, 33, 36, 37, 30.01, 30.02, 282; 239/584

(56) References Cited

U.S. PATENT DOCUMENTS

| | | | |
|---|---|---|---|
| 4,728,074 | * 3/1988 | Igashira et al. | 251/57 |
| 5,660,368 | * 8/1997 | De Matthaeis et al. | 251/30.02 |
| 5,697,554 | * 12/1997 | Auwaerter et al. | 239/584 |
| 5,779,149 | * 7/1998 | Hayes, Jr. | 239/124 |
| 5,803,370 | * 9/1998 | Heinz et al. | 239/533.9 |
| 5,810,255 | * 9/1998 | Itoh et al. | 251/129.06 |

* cited by examiner

*Primary Examiner*—Kevin Shaver
*Assistant Examiner*—Eric Keasel
(74) *Attorney, Agent, or Firm*—Ronald E. Greigg; Edwin E. Greigg

(57) ABSTRACT

A valve for controlling liquids which for its actuation is provided with a liquid-filled coupling chamber, which is disposed between an actuator piston of a piezoelectric actuator and a piston that actuates a valve member. To compensate for liquid losses suffered by the coupling chamber, which is briefly at high in each work cycle, the pressure difference that exists during the return stroke of the actuator piston between the coupling chamber and the opposite sides of the actuator piston and of the that actuates the valve member that are remote from the coupling chamber is utilized to achieve refilling in valveless fashion along gaps. The valve is used for use in fuel injection systems for internal combustion engines of motor vehicles.

20 Claims, 4 Drawing Sheets

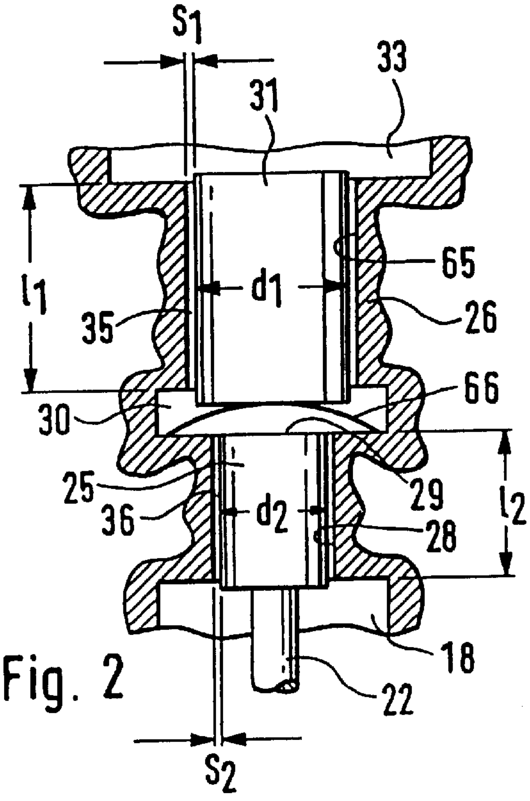
Fig. 2
Fig. 3
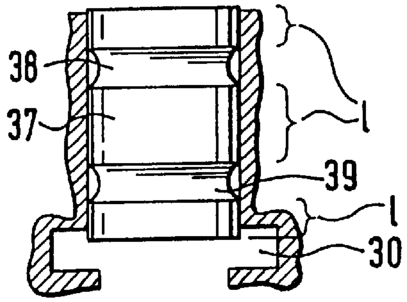
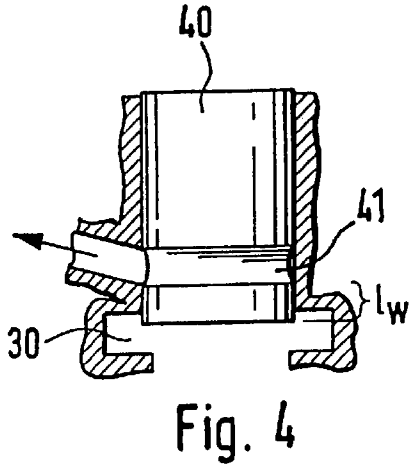
Fig. 4
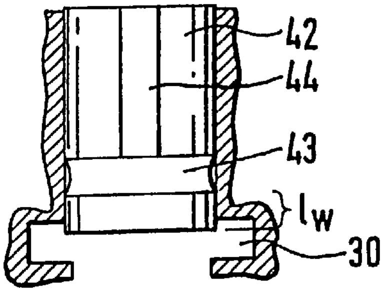
Fig. 5

PIEZOELECTRICALLY ACTUATED FUEL INJECTION VALVE

PRIOR ART

The invention relates to a valve for controlling liquids One such valve is known from European Patent Disclosure EP 0 477 700. There, the actuating piston of the valve member is disposed, tightly displaceably, in a smaller-diameter portion of a stepped bore, while conversely a larger-diameter piston which is moved by the piezoelectric actuator is disposed in a larger-diameter portion of the stepped bore. A hydraulic chamber is defined between the two pistons, in such a way that whenever the larger piston is moved a certain distance by the actuator, the actuator piston of the valve member is moved by an increased distance, the increase being due to the step-up ratio of the cross-sectional areas of the stepped bore. The valve member, the actuator piston, the larger-diameter piston and the piezoelectric actuator are located in line with one another along a common axis.

In such valves, there is the problem of compensating for changes in length of the piezoelectric actuator, the valve, the enclosed pressure chamber liquid, or the valve housing by means of the hydraulic coupling chamber. Since, to open the valve, the piezoelectric actuator generates a pressure in the pressure chamber, this pressure also leads to a loss of pressure chamber liquid. To prevent the coupling chamber from being pumped dry, refilling is necessary. A device which is supposed to effect such refilling is indeed already known from the prior art defined at the outset, but it has the disadvantage that a constantly open communication in both of the possible flow directions between the coupling chamber and a closed supply container, the latter being equipped with a certain constant volume, has a substantial influence on the operating performance of the piezoelectric actuator. In particular, a thus-increased volume leads to a compressibility that lessens the transfer rigidity of the hydraulic column formed by the coupling chamber. Yet the known device essentially contemplates leakage from the coupling chamber, in order to compensate for tolerances in the working stroke. To counteract the attendant increase in compressibility, provision is made for adding stabilizing material, which has a compressibility-reducing effect, to the liquid in the coupling chamber. This purpose is served for instance by rubber or metal elements that are added to the liquid.

ADVANTAGES OF THE INVENTION

The valve of the invention has the advantage over the prior art that the coupling chamber always remains adequately well filled, because replenishing coupling liquid can flow toward the coupling chamber from the adjoining low-pressure chambers in the periods between the working strokes of the piezoelectric actuator. Any change in length of the overall device that may occur is thus corrected on an ongoing basis. The refilling or replenishment of the coupling chamber is accomplished without problems via the piston guides. This is true even if the piezoelectric actuator, the valve, the enclosed pressure chamber liquid, or the housing should change its length, for instance from warming up, because such a change in length in the coupling chamber is compensated for by leakage. It is also advantageous that the device functions securely and reliably, is simple in design, and assures secure, reliable sealing.

In an advantageous refinement set forth herein, the filling is promoted by the volumetric increase in the return stroke of the actuator piston, along with the piezoelectric actuator and the resultant pressure drop.

This pressure drop is advantageously also reinforced according to claim 4, by a spring that urges the actuator piston toward the piezoelectric actuator. The invention is substantially improved by the provision gaps of defined size, which are designed for their task of refilling the coupling chamber. The dimensioning rule recited herein promotes this sizing very substantially.

The planning of the construction of the piston that actuates the valve and of the actuator piston can be done on this basis, which says that only part of the length of the pistons determines the criteria that define the communication between the low-pressure chamber and the coupling chamber, while a remaining part of the piston in each case furnishes the length that is required to assure exact guidance of the pistons. This is improved still further in which only a short gap length near the coupling chamber is provided for the pistons, and where the liquid can be brought, unthrottled, out of the low-pressure chamber to quite near the gap $l_w$ via the pressure fluid conduit.

A substantial improvement in the refilling according to the invention is obtained by setting a certain pressure, which is raised above the ambient pressure, in the low-pressure chambers. This increases the pressure drop toward the coupling chamber, which promotes the refilling of the coupling chamber; this pressure is furnished as recited hereinafter.

BRIEF DESCRIPTION OF THE DRAWINGS

Several exemplary embodiments of the invention are shown in the drawings and described in detail in the ensuing description. Shown are:

FIG. 2, a first exemplary embodiment of a piston arrangement for a coupling chamber with liquid replenishment;

FIG. 3, another design of a piston;

FIG. 4, a modification of the piston design of FIG. 3;

FIG. 5, a further modification of a piston design of FIG. 3;

DESCRIPTION OF THE EXEMPLARY EMBODIMENTS

Figure 1:
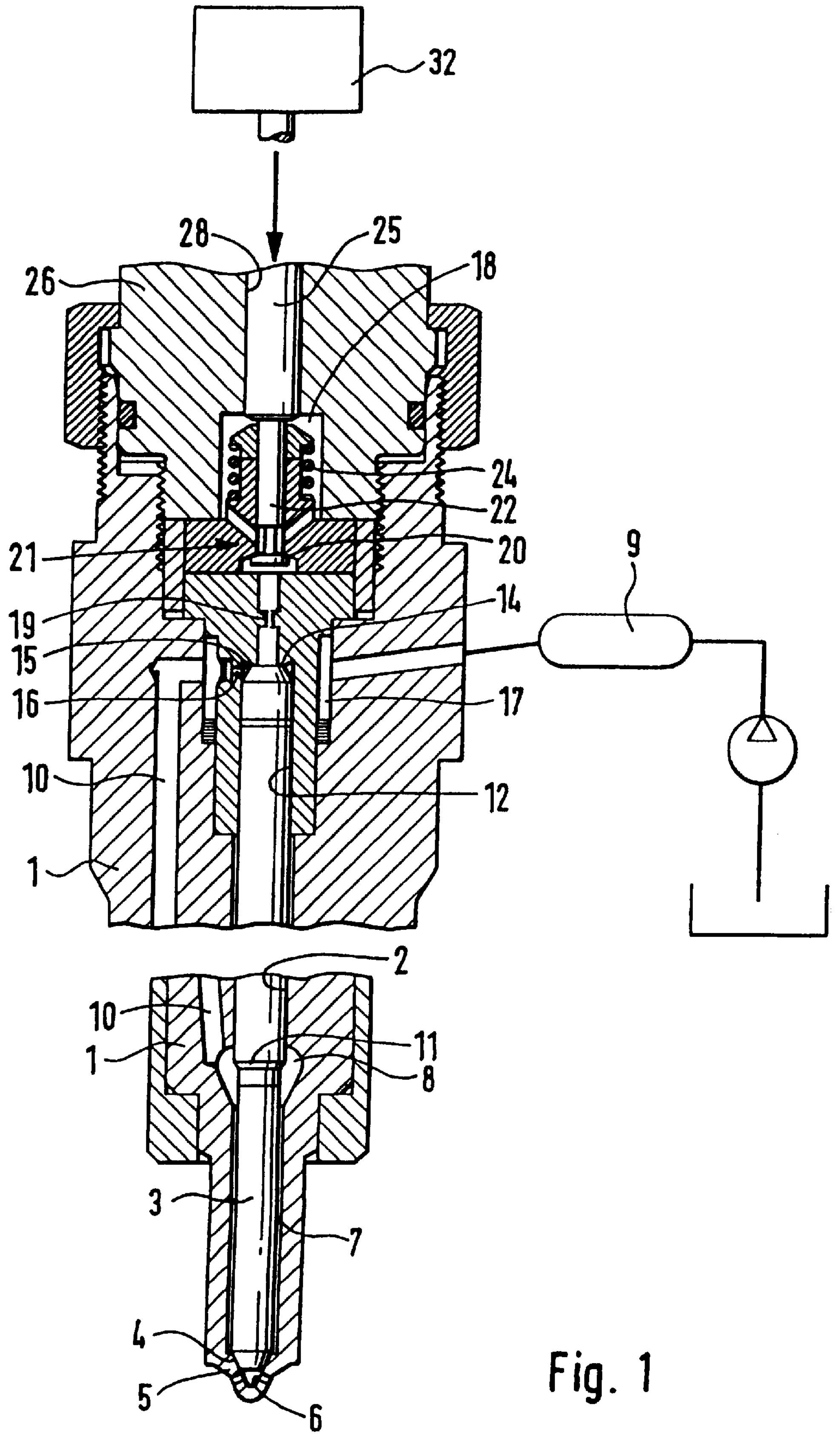
FIG. 1, a fuel injection valve in section.

The valve of the invention is used in a fuel injection valve, which is shown in its essential parts in section in FIG. 1. This injection valve has a valve housing 1, in which a valve needle 3 is guided in a longitudinal bore 2; this valve needle can also be prestressed in the closing direction by a closing spring in a known manner and not shown further here. On one end, the valve needle is provided with a conical sealing face 4, which cooperates, on the tip 5 of the valve housing that protrudes into the combustion chamber, with a seat 6 from which injection ports lead away into the interior of the injection valve, in this case connecting the annular chamber 7, filled with fuel under injection pressure, with the combustion chamber so as to execute an injection once the valve needle has lifted from its seat. The annular chamber communicates with a further pressure chamber 8, which is in constant communication with a pressure line 10, by way of which fuel is delivered at injection pressure to the fuel injection valve from a high-pressure fuel reservoir 9. This high fuel pressure also acts in the pressure chamber 8, specifically on a pressure shoulder 11 there, by way of which the nozzle needle can be lifted from its valve seat in a known manner, under suitable conditions.

On its other end, the valve needle is guided in a cylinder bore 12, where with its face end 14 it encloses a control pressure chamber 15 that communicates constantly, via a throttle connection 16, with an annular chamber 17, which like the pressure chamber 8 is always in communication with the high-pressure fuel reservoir 9. A bore that has a throttle 19 leads axially away from the control pressure chamber 15 to a valve seat 20 of a control valve 21. Cooperating with the valve seat is a valve member 22 of the control valve, which in the lifted state of the valve establishes communication between the control pressure chamber 15 and a low-pressure chamber 18 that communicates constantly with a relief chamber. A compression spring 24 that urges the valve member 22 in the closing direction is disposed in the low-pressure chamber 18 and urges the valve member 22 onto the valve seat 20, so that in the normal position of the control valve, this communication of the control pressure chamber 15 is closed. Since the area of the end face of the valve needle 3 in the region of the control pressure chamber is larger than the area of the pressure shoulder 11, the same fuel pressure in the control pressure chamber as prevails in the pressure chamber 8 now keeps the valve needle 3 in the closed position. If the valve member 22 is lifted from its seat, however, then the pressure in the control pressure chamber 15, which is decoupled via the throttle connection 16, is relieved. With the closing force now absent or reduced, the valve needle 3 opens quickly, optionally counter to the force of a closing spring, and on the other hand can be brought into the closing position as soon as the valve member returns to its closing position, because from that time on, via the throttle connection 16, the original high fuel pressure then rapidly builds up again in the control pressure chamber 15.

The control valve of the invention has a piston 25 for its actuation, which acts on the valve member 22 and is actuatable by a piezoelectric actuator 32 not shown in further detail. The piston 25 is tightly guided in a guide bore 28 disposed in a housing portion 26 of the fuel injection valve, and with its end face 29, as can be seen from FIG. 2, it defines a coupling chamber 30, which is closed off on its opposite wall by an actuator piston 31 of larger diameter, which is in a bore 65 and is part of the piezoelectric actuator 32 and which in addition can be coupled in force-locking fashion to the piezoelectric actuator 32 by a spring washer 57 disposed in the coupling chamber 30. The return of the actuator piston together with the piezoelectric actuator 32 can also be done in some other suitable way instead. Both pistons 25 and 31 are guided tightly in their bores. Because of the different piston face areas of the two pistons 25 and 31, the coupling chamber 30 acts as a step-up chamber, because it steps up a structurally dictated short stroke of the piezoelectric actuator piston 31 into a longer stroke of the piston 25 that actuates the control valve 21. Upon excitation of the piezoelectric actuator 32, the piston 25 is displaced far enough that the valve member 22 lifts from its seat 20. The effect of this is a relief of the control pressure chamber 15, which in turn brings about the opening of the valve needle 3.

In FIG. 2, the coupling chamber 30 and the two pistons 25 and 31 are shown separately from the valve housing 1. The low-pressure chamber 18 is disposed in housing part 26 on the side of the piston 25, while a low-pressure chamber 33 is disposed on the side of the piston 31 remote from the coupling chamber 30. The cylinder bores for the pistons 25 and 31 have gaps 35 and 36 of width s1 and S2, respectively, by way of which the low-pressure chambers 33 and 18 communicate with the coupling chamber 30. The length of the gap 35 is designated $l_1$ and that of the gap 36 is designated $l_2$; the diameter of the piston 31 is $d_1$ and that of the piston 25 is $d_2$.

For actuating the valve member 22, the piezoelectric actuator 32 is excited, and consequently the actuator piston 31 is displaced. This leads to a pressure increase in the coupling chamber 30, which in turn results in a displacement of the piston 25 together with the valve member 22. Because of the different diameters of the pistons, the piston 25 moves farther in this process than the actuator piston 31. The pressure increase in the coupling chamber leads to leakage losses of coupling chamber liquid via the leakage gaps between the pistons 25 and 31 and their guidance in the bores. However, the time periods within which a high pressure prevails in the coupling chamber, in order to actuate the valve member, are short in comparison to the time periods, or load pauses, in between.

In order for the coupling chamber 30 not to be pumped dry over the course of time via the gaps 35 and 36, at a high pressure that ensues in valve operation, the invention makes it possible by means of rapid refilling of the coupling chamber 30 in the load pauses and also at relatively low pressures in the low-pressure chambers 18 and 33, so as to compensate for any liquid loss that has occurred. This is promoted by the fact that the actuator piston moves back again along with the piezoelectric actuator when it is not excited. This is advantageously reinforced if the actuator piston is urged toward the piezoelectric actuator by a restoring force, which is preferably furnished by the spring 57 that is supported in the coupling chamber 30.

For this refilling, the two pistons 25 and 31 and their guides must be designed geometrically in a special way, to attain optimal operability of the arrangement and repeated restoration of the fill volume of the coupling chamber 30. The goal, as the characteristic leakage rate value, is a geometric ratio in accordance with the following equation:

$$\frac{n \cdot d \cdot s^3}{V_0 \cdot l} \geq 4,$$

in which d is the mean piston diameter in mm, s is the gap width in $\mu$m, l is the sealing gap length in mm, n is the number of sealing gaps or pistons, and $V_0$ is the initial volume of the coupling chamber in $mm^3$, or even better, a ratio:

$$\frac{n \cdot d \cdot s^3}{V_0 \cdot l} \geq 8.$$

From such a ratio onward, the fastest possible refilling is achieved, without tolerances, especially in the gaps 35 and 36, having any major influence on the duration of the refilling. From the above ratio, it follows that the gaps and the piston diameter selected should tend to be large, and that the initial volume and the sealing gap length selected should be small. This characteristic leakage rate value of ≧8 should not be selected as being overly large, however, because otherwise the leakage rate becomes too high and the coupling function, that is, the hydraulic rigidity of the coupling chamber filling volume becomes less and thus the stroke becomes shorter. To keep the rigidity of the coupling chamber 30, which is required for switching the valve, as high as possible, the initial volume $V_0$ of the coupling chamber should be as small as possible.

If, for reasons of guidance precision and the attendant gap geometry that should be kept constant for the two pistons 25 and 31, the gaps 35 and 36 are not selected to be overly large, and the piston lengths $l_1$ and $l_2$ are not selected to be overly short, and nevertheless the characteristic value should be $$\frac{n \cdot d \cdot s^3}{V_0 \cdot 1} \geq 4,$$

then designs of the kind shown in FIGS. 3, 4 and 5 can be used for the pistons 25 and 31; in these designs, the hydraulically effective sealing gap length is reduced, or in other words is limited to a short length that defines the above characteristic value.

In FIG. 3, a piston 37 is shown whose length 1 is interrupted twice by annular grooves 38 and 39, so that despite a short sealing gap length, guide elements that are far apart are obtained, which improves the guidance precision. The gap lengths located between the annular groove 39 and 38, the low-pressure chamber 18 and 33 and the coupling chamber 30 are shorter than the original total length of the piston. The result is a geometric ratio for the characteristic leakage rate value in accordance with the above formula, which is more favorable for the filling while having very good guidance precision.

In the design of FIG. 4, a piston 40 has an annular groove 41, which is disposed near the coupling chamber 30 and thus there defines a short effective gap length $l_w$. This short gap length enters only into the value obtained by the above formula. The piston part following this effective gap length serves as a necessary guidance part but has no influence of the value resulting from the above formula. In this way, the favorable value for refilling in the load pauses can be attained in a simple and reliable way.

Finally, in FIG. 5 a piston 42 is shown which compared with the version of FIG. 4 with the short sealing gap length for the piston 40, is modified such that here, one or more lateral flat faces 44 lead away to the end of the piston from the annular groove 43, which is equivalent to the annular groove 41 of FIG. 4. In such a design, the very short gap length $l_w$, which meets the above requirement is attained, yet the guidance of the piston 42 is still over a relatively long length and thus is precise. The gap width defined by the annular groove 43 and the lateral flat faces 44 is hydraulically so large that it is inoperative for a sealing function, and the piston part that is determined by its length acts only as a piston guide but does not enter into the result of the characteristic leakage rate value. The flat face 44 can be considered a pressure fluid conduit, through which the annular groove 43 is supplied with pressure fluid from the adjoining low-pressure chamber. This flat face may be realized in some other way, instead, however, such as in the form of a bore or some other kind of conduit between the annular groove 43 and the low-pressure chamber.

Figure 6:
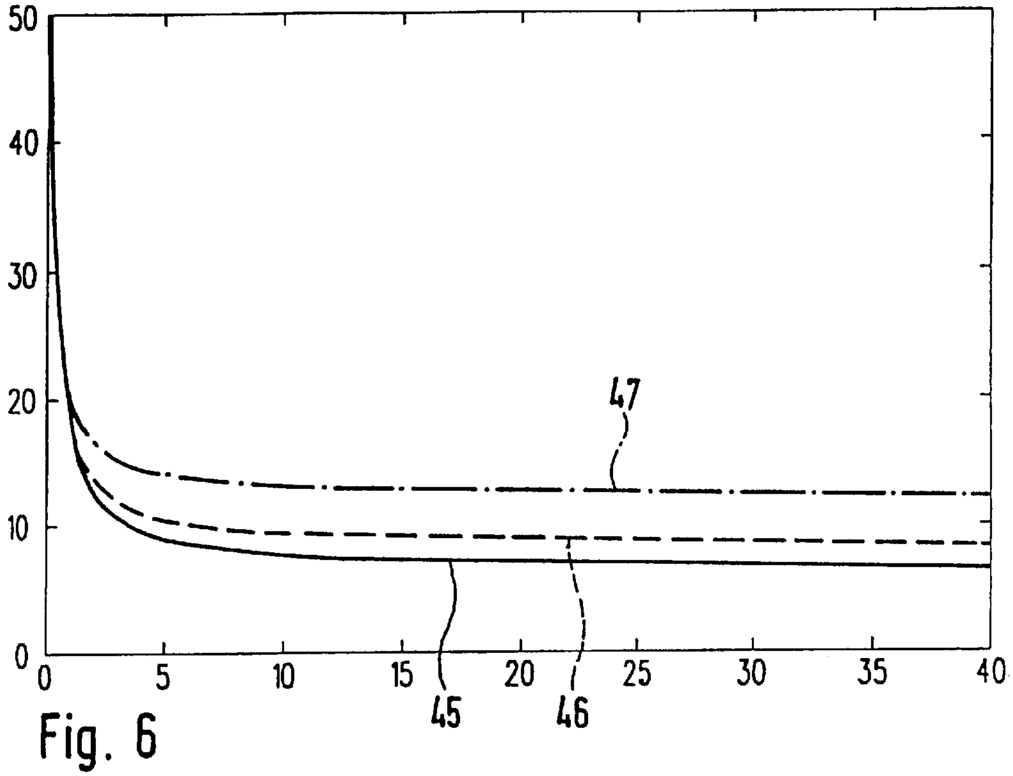
FIG. 6, a graph of the course of the refilling over time.

FIG. 6 shows a graph which with the three curves 45, 46 and 47 illustrates the variable duration of the refilling in proportion to the duration of application of the operating pressure in the coupling chamber and at various ambient pressures. A time ratio is plotted on the ordinate, which is determined by the length of time required to refill the coupling chamber to a certain pressure, such as 90% of the ambient pressure, and the values of the leakage rate variable that result from the above formula at different parameters and with two gaps, that is, with two pistons, i.e., the pistons 25 and 31, are plotted ascending the abscissa. It can be seen that with large gaps, i.e. as the values resulting from the above formula increase, the refilling proceeds faster and in a more favorable way. Conversely, for characteristic leakage rate values <4, the lengths of time tend to infinity. An essential factor here is also the pressure that prevails in the low-pressure chamber. With increasing pressure, faster refilling is obtained.

Figure 7:
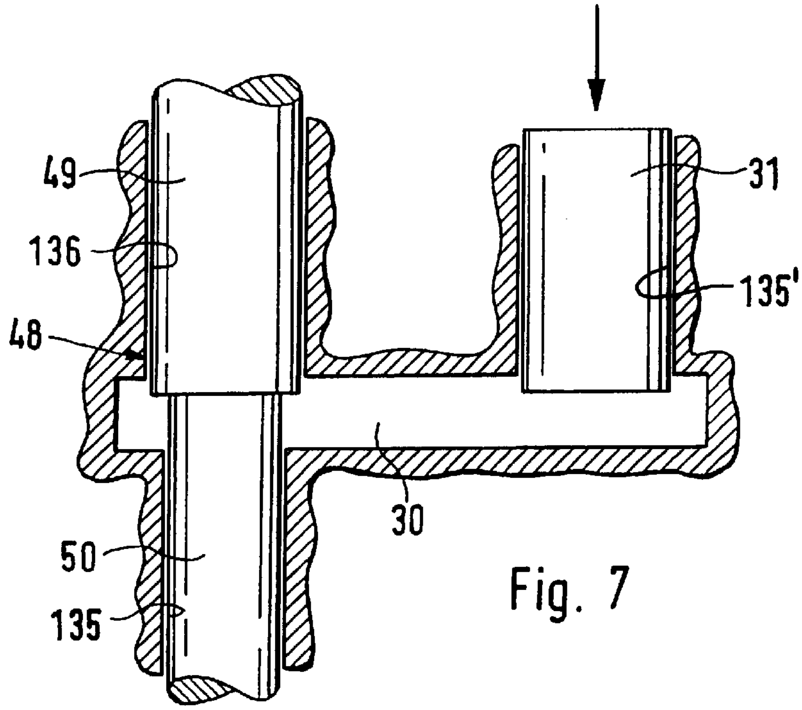
FIG. 7, a design with three pistons.

In FIG. 7, a design with three pistons is shown, that is, with the actuator piston 31 already described and with the coupling chamber 30. However, here a piston that actuates the control valve 21 is embodied as a stepped piston, which is provided with two pistons 49 and 50. Consequently there is a total of three gaps 135, 136, and 135 here, by way of which liquid can escape from the coupling chamber and by way of which the coupling chamber 30 must be refilled. For this kind of design as well, the refilling according to the invention can be employed. It can also be employed for devices with more than three pistons.

Figure 8:
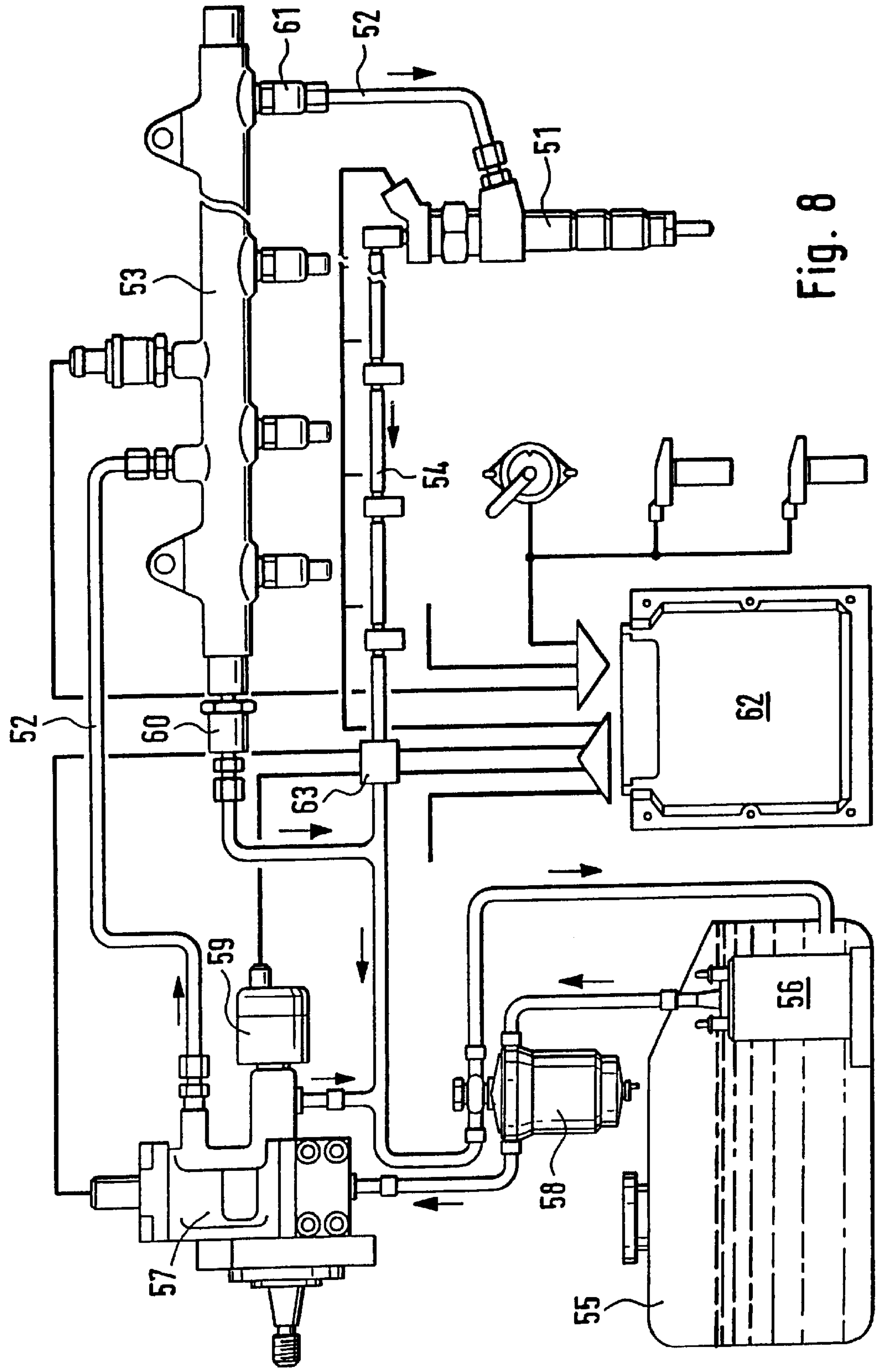
FIG. 8, an injection system having the fuel injection valve of the invention.

In an injection system of the kind shown in simplified form in FIG. 8, one injection valve 51 per engine cylinder, as described above in conjunction with FIG. 1, is used. The injection valve 51 is connected on the one hand to a high-pressure reservoir 53 via a supply line 52, and to a low-pressure container 55 (tank) via a return line 54. The injection system also includes a fuel pump 56, a high-pressure pump 57, an overflow valve 58, a pressure control valve 59, a pressure limiter 60, a flow limiter 61, and an electronic control unit 62.

According to the invention, a pressure holding valve 63, which is set to a pressure of from 10 to 20 bar, is inserted into the return line 54 that leads from the injection valve 51 to the tank 55. The return line 54 must then be embodied in a suitably stable way. In the injection valve 51, the two low-pressure chambers 18 and 33 which are located on the two sides, remote from the coupling chamber 30, of the actuator piston 31 and of the piston 25 that actuates the valve member 22 are connected to the low pressure, as already described, and this low pressure is now held to an elevated level, for instance of 10 to 20 bar, by the pressure holding valve 63.

This kind of provision then effects rapid refilling of the coupling chamber 30 via the gaps 35 and 36 (see FIG. 2) in accordance with the equation $$Q = \frac{\pi \cdot d \cdot s^3}{12 \cdot n \cdot l} \cdot (P0 - Pkopp),$$

in which Q is the flow rate, d is the piston diameter, s is the gap size, n is the dynamic viscosity, and l is the leakage gap length.

The use of a restraining valve 63 is especially recommended whenever the pressure difference between the pressure in the coupling chamber 30, which has dropped to approximately 0 bar after the actuator stroke, and the ambient pressure of 1 bar until the next injection event of the internal combustion engine (25 ms, for instance, at an engine speed of 4800 rpm) is not sufficient for refilling the coupling chamber 30. With the differential pressure increased to from 10 to 20 bar, it is certain that the coupling chamber 30 can be refilled within the short length of time available. An advantage here is that only a single pressure holding valve 63 per engine is needed.

The foregoing relates to a preferred exemplary embodiment of the invention, it being understood that other variants and embodiments thereof are possible within the spirit and scope of the invention, the latter being defined by the appended claims.

What is claimed is:

1. A valve for controlling liquids, comprising a piezoelectric actuator (32), a valve member (22) which is actuatable in an opening direction via a piston (25) by said piezoelectric actuator (32) counter to a force of a spring (24), said piston (25) includes a first face end (29) which closes off a hydraulic coupling chamber (30), said hydraulic coupling chamber (30) is defined on a second side by a second face end of an actuator piston (31) which has a larger diameter than a diameter of the piston (25) and is a part of said piezoelectric actuator (32), a working stroke of said piston (31) increases a pressure in the coupling chamber (30), the piston (25) is adjusted by said working stroke and the pressure in said coupling chamber (30) counter to the force of the compression spring (24), a low pressure chamber (33) is formed on an end of said piston (31) remote from the coupling chamber (30) and a low pressure chamber (18) is formed opposite a second face end of said piston (25) remote from said first end face (29), via the pressure chamber (18) a piston (15) actuates the valve member (22), respective low-pressure chambers (18 and 33) are provided in which oil leakage pressure prevails, a gap (36) is located between the outer circumference of the piston (25) and a guide bore (28) and a gap (35) is located between an outer circumference of the actuator piston (31) and a guiding bore (65) by which oil leakage is directed to low pressure chambers (18 and 33), said guiding bores (28 and 65) along the pistons (25) and (31) are dimensioned such that whenever there is no pressure increase in said coupling chamber (30), the coupling chamber (30) is refilled from the low-pressure chambers (18) and (33) via said gaps (28 and 65) to compensate for leakage losses via said gaps into the low-pressure chambers that occur during high pressure periods, and the periods that are between these occurrences of pressure increases are shorter than the periods during which the pressure increases occur.

2. The valve according to claim 1, in which a leakage loss in the coupling chamber (30) is compensated for by an increase in a volume of a coupling chamber pressure drop, occurring as a result of a return stroke of the actuator piston (31), between the coupling chamber (30) and the low-pressure chambers (18) and (33).

3. The valve according to claim 2, in which the actuator piston (31) is coupled by a restoring spring (66) to the piezoelectric actuator (32) for a return stroke.

4. The valve according to the claim 3, in which the coupling chamber (30) is refilled via the gaps (35) and (36) along a defined length $l_1$ and $l_2$, respectively, of the gaps of the pistons (25) and (31), and the gaps are dimensioned such that refilling of the coupling chamber (30) is always made possible within the periods between the individual working strokes of the piezoelectric actuator (32).

5. The valve according to claim 2, in which the coupling chamber (30) is refilled via the gaps (35) and (36) along a defined length $l_1$ and $l_2$, respectively, of the gaps of the pistons (25) and (31), and the gaps are dimensioned such that refilling of the coupling chamber (30) is always made possible within the periods between the individual working strokes of the piezoelectric actuator (32).

6. The valve according to claim 5, in which for refilling the coupling chamber (30), in the periods during which there are no pressure increases, the following geometric ratio is adhered to for the length and the width of the gaps, referred to the largest volume occupied by the coupling chamber:

$$\frac{n \cdot d \cdot s^3}{V_0 \cdot 1} \geq 4,$$

in which $V_0$ is the volume of the coupling chamber (30) in $mm^3$, n is the number of gaps that lead away from the chamber (30), s is the width of the gap (35, 136) in μm, 1 is the length of the gap in mm, and d is the mean diameter of the pistons in mm.

7. The valve according to claim 6, in which the piston (25) for actuating the valve member (22) and/or the actuator piston (31) is subdivided in a length of its guidance in the respective bore (28) and (65) by at least one annular groove (38, 39, 41, 43).

8. The valve according to claim 7, in which between the coupling chamber (30) and the at least one annular groove (41, 43), a short gap length $l_w$ is defined which meets the geometric ratio, and the parts of the piston located on a far side of the at least one annular groove (41, 43) are embodied as parts (40, 42) used for guidance.

9. The valve according to claim 8, in which between the at least one annular groove (43) and a side of the piston (42) toward the low-pressure chamber (18, 34), a pressure fluid conduit (44) is provided, by which the annular groove is supplied, unthrottled, with pressure fluid.

10. The valve according to claim 5, in which for refilling the coupling chamber (30), in the periods during which there are no pressure increases, the following geometric ratio is adhered to for the length and the width of the gaps, referred to the largest volume occupied by the coupling chamber:

$$\frac{n \cdot d \cdot s^3}{V_0 \cdot 1} \geq 4,$$

in which $V_0$ is the volume of the coupling chamber (30) in $mm^3$, n is the number of gaps that lead away from the chamber (30), s is the width of the gap (35, 136) in μm, 1 is the length of the gap in mm, and d is the mean diameter of the pistons in mm.

11. The valve according to claim 10, in which the piston (25) for actuating the valve member (22) and/or the actuator piston (31) is subdivided in a length of its guidance in the respective bore (28) and (65) by at least one annular groove (38, 39, 41, 43).

12. The valve according to claim 11, in which between the coupling chamber (30) and the at least one annular groove (41, 43), a short gap length $l_w$ is defined which meets the geometric ratio, and the parts of the piston located on a far side of the at least one annular groove (41, 43) are embodied as parts (40, 42) used for guidance.

13. The valve according to claim 12, in which between the at least one annular groove (43) and a side of the piston (42) toward the low-pressure chamber (18, 34), a pressure fluid conduit (44) is provided, by which the annular groove is supplied, unthrottled, with pressure fluid.

14. The valve according to claim 2, in which the coupling chamber (30) is defined by a face end of the actuator piston (31) and by a plurality of pistons (49) and (50).

15. The valve according to claim 2, in which the pressure in the low-pressure chambers is kept at a predetermined level that is raised compared to the ambient pressure.

16. The valve according to claim 1, in which the coupling chamber (30) is defined by a face end of the actuator piston (31) and by a plurality of pistons (49) and (50).

17. The valve according to claim 16, in which the pistons (49) and (50) are combined into one stepped piston (48).

18. The valve according to claim 1, in which the pressure in the low-pressure chambers is kept at a predetermined level that is raised compared to the ambient pressure.

19. A fuel injection system which comprises a valve as set forth in claim 18, a high-pressure pump (57), high-pressure reservoir (52), and low-pressure container (55), and a low-pressure side of said valve is connected to the low-pressure container (55) and communicates with the low-pressure chambers (18) and (33) of the valve, a pressure holding valve (63) which is set to a pressure of over 1 bar is inserted into a return line (54).

20. A fuel injection system as set forth in claim 19, in which the operative pressure in the low-pressure chambers (18) and (33) is set to from 10 to 20 bar.

* * * * *